United States Patent
Zamfir et al.

(10) Patent No.: US 7,835,267 B2
(45) Date of Patent: Nov. 16, 2010

(54) DYNAMIC PATH PROTECTION IN AN OPTICAL NETWORK

(75) Inventors: Anca Zamfir, Kanata (CA); Zafar Ali, Windsor (CA); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1108 days.

(21) Appl. No.: 11/124,687

(22) Filed: May 9, 2005

(65) Prior Publication Data

US 2006/0250948 A1    Nov. 9, 2006

(51) Int. Cl.
*H04J 1/16* (2006.01)
*H04L 12/28* (2006.01)

(52) U.S. Cl. .................. 370/216; 370/219; 370/401

(58) Field of Classification Search ......... 370/217–219, 370/220, 216, 252, 221–228, 401, 400; 398/48–49
See application file for complete search history.

(56) References Cited

U.S. PATENT DOCUMENTS

| | | | | |
|---|---|---|---|---|
| 6,952,395 B1* | 10/2005 | Manoharan et al. | ......... | 370/219 |
| 7,023,793 B2* | 4/2006 | Khambatkone et al. | ..... | 370/218 |
| 7,126,907 B2* | 10/2006 | Carpini et al. | ............ | 370/218 |
| 7,313,094 B2* | 12/2007 | Oki et al. | .................... | 370/238 |
| 7,345,991 B1* | 3/2008 | Shabtay et al. | .............. | 370/221 |
| 7,345,994 B2* | 3/2008 | Sivabalan et al. | ........... | 370/228 |
| 7,411,964 B2* | 8/2008 | Suemura | .................... | 370/400 |
| 7,620,322 B2* | 11/2009 | Sparks et al. | ................ | 398/49 |
| 7,627,243 B2* | 12/2009 | Sadananda | ..................... | 398/7 |
| 7,627,343 B2* | 12/2009 | Fadell et al. | ................ | 455/557 |
| 2003/0117950 A1* | 6/2003 | Huang | ....................... | 370/220 |
| 2004/0076151 A1* | 4/2004 | Fant et al. | .................... | 370/389 |
| 2004/0114595 A1* | 6/2004 | Doukai | ....................... | 370/389 |
| 2004/0190444 A1* | 9/2004 | Trudel et al. | ................ | 370/224 |
| 2004/0190446 A1* | 9/2004 | Ansorge et al. | ............. | 370/228 |
| 2004/0252635 A1* | 12/2004 | Kasper | ....................... | 370/216 |
| 2005/0122908 A1* | 6/2005 | Soumiya et al. | ............. | 370/241 |
| 2005/0180431 A1* | 8/2005 | Kinoshita et al. | ........... | 370/397 |

OTHER PUBLICATIONS

SuKyoung Lee, Chul Kim, David Griffith. Hierarchical REstoration Scheme for Multiple Failures in GMPLS Networks, entire document, IEEE 2002.*

Eric Mannie et al., Recovery (Protection and Restoration) Terminology for Generalized Multi-Protocol Label Switching (GMPLS), Internet Draft IETF, Oct. 2004.

* cited by examiner

*Primary Examiner*—Kwang B Yao
*Assistant Examiner*—Candal Elpenord
(74) *Attorney, Agent, or Firm*—Cindy Kaplan

(57) ABSTRACT

A method and system for dynamic protection of virtual links for paths of an optical network in communication with an IP network are disclosed. The method includes establishing two or more paths within the optical network and grouping the paths in a dynamic bundle. The grouping is selected at a control plane level and the bundle of paths are recognized as a single routing adjacency in the IP network so that as long as one or more paths within the bundle is operating, the routing adjacency in the IP network is not affected by changes within the bundle.

18 Claims, 6 Drawing Sheets

DYNAMIC PATH PROTECTION IN AN OPTICAL NETWORK

BACKGROUND OF THE INVENTION

The present invention relates generally to communication networks, and more specifically, to dynamic path protection in an optical network and integration with link protection schemes in an IP network.

The rapid growth of the Internet and the widespread deployment of networks built around the Internet Protocol suite are creating a demand for new capabilities in IP (Internet Protocol) networks. MultiProtocol Label Switching (MPLS) provides a number of powerful capabilities such as traffic engineering, etc. As with IP routers, MPLS nodes use a routing protocol such as OSPF or IS-IS to calculate network paths and establish reachability. MPLS is an IETF (Internet Engineering Task Force) initiative that integrates Layer 2 information about network links (bandwidth, latency, utilization) into Layer 3 (IP) within a particular autonomous system in order to simplify and improve IP packet exchange. MPLS-TE provides network operators a great deal of flexibility to divert and route traffic around link failures, congestion, and bottlenecks.

Generalized MPLS (GMPLS) extends MPLS-TE to provide a control plane (signaling and routing) for devices that switch in domains such as packet, time, wavelength, and fiber. This common control plane simplifies network operation and management by automating end-to-end provisioning of connections, managing network resources, and providing a level of QoS that is expected in new applications. GMPLS extends the suite of IP-based protocols that manage and control the establishment and release of label switched paths (LSPs) that traverse any combination of packet, TDM, and optical networks.

Protection of switched LSPs is important, and more particularly, with respect to GMPLS nodes connected in a general topology and under tight time constraints. One requirement for protection in IP and optical networks is to avoid or reduce the effects of failures in optical network in the IP topology/traffic. More specifically, if a link that is part of an end-to-end GMPLS connection fails, it is preferred that this failure not result in a failure of routing adjacency (e.g., IGP adjacency). This is because local failures can be addressed much more quickly and efficiently inside the optical network. Also, IP convergence is slower than any technique that optical networks can provide and there is a need for service isolation. Thus, service providers in general would like the GMPLS network to handle failures in the optical networks such that they do not affect routing adjacencies.

Conventional approaches for protection against failures in optical networks in the IP topology/traffic have the drawback that a failure in doing local restoration results in failure of routing adjacencies.

There is, therefore, a need for a system and method for handling failures in an optical network such that the failure does not affect routing adjacencies.

SUMMARY OF THE INVENTION

A method and system for dynamic path protection in an optical network and integration with link protection schemes in an IP network are disclosed. The method includes establishing two or more paths within the optical network and grouping the paths in a dynamic bundle. The grouping is selected at a control plane level and the bundle of paths are recognized as a single routing adjacency in the IP network so that as long as one or more paths within the bundle is operating, the routing adjacency in the IP network is not affected by changes within the bundle.

In another aspect of the invention, a method for dynamic end-to-end path protection in an optical network generally comprises the establishment of a number of working and protecting paths and selecting new paths for a subset of these paths when an event causing network topology changes occurs. The new paths are selected such that the overall diversity and optimality degree are maintained to a level allowed by the new topology.

In yet another aspect of the invention, a system for providing dynamic end-to-end protection in an optical network generally comprises a processor operable to create two or more paths within the optical network and group two or more of the paths in a bundle. The system further comprises a protection module configured to dynamically identify the physical interfaces spanned by optical LSPs, manage the component interfaces of the bundle, and maintain synchronization with the data plane protection scheme activated for the bundle.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. A network element may be, for example, a terminal multiplexer, an add-drop multiplexer (ADM), photonic switch (PXC), optical crossconnect (OXC) with optical-electrical-optical (OEO) conversion, SONET crossconnect, signal regenerator, router, switch, or other optical or IP node interface. The network may include an IP based packet switching network connected to an optical transport network (OTN). A router is connected to the OTN nodes using standard interfaces (e.g., 4×OC192 POS, 16×OC48 POS, N×10GE, etc.), as is well known by those skilled in the art.

Figure 1A:
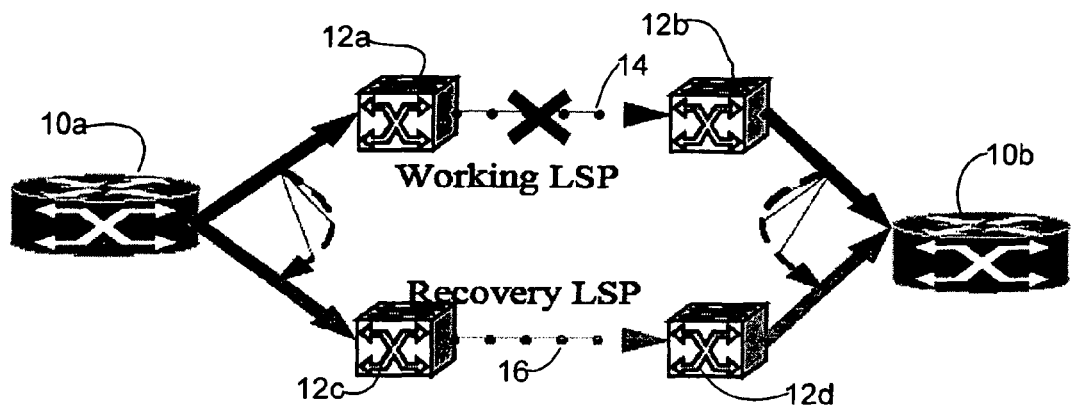
FIG. 1A is an example of a network in which the present invention may be implemented.

FIG. 1A illustrates an example of a network in which data transmission occurs on generalized label-switched paths (G-LSPs). The G-LSPs are automatically setup and torn down by means of a signaling protocol, as is well known by those skilled in the art. (In the following description, the term LSP is also used to refer to generalized LSPs.) FIG. 1A illustrates end-to-end protection with one working path 14 (between nodes 12a and 12b) and one protecting (recovery) path 16 (between nodes 12c and 12d). The working and protecting paths 14, 16 are preferably signaled as two LSPs that belong to the same tunnel. The working LSP 14 transports traffic between routers 10a and 10b and the protecting LSP 16 is used to transport traffic when the working LSP fails. End-to-end recovery provides recovery of the entire LSP from its source (ingress router end-point 10a) to its destination (egress router end-point 10b).

It is to be understood that the arrangement shown in FIG. 1A is only one example and the invention described herein may be applied to a network having any number of working or recovery LSPs.

A method and system disclosed herein provide integration of GMPLS control plane and available data plane protection techniques. Dynamic protection is provided for virtual links associated with the GMPLS LSPs that are used in communication with the IP network. More specifically, the method and system provide dynamic end-to-end path protection in an optical network and integration of the optical network with link protection schemes in the IP network. The data plane protection techniques include: link bundling of GMPLS tunnel interfaces; SONET APS protection for GMPLS tunnel interfaces; and FRR over GMPLS tunnel interfaces. The first two techniques are described together under Dynamic Bundles in the following detailed description and the third technique is described separately under Dynamic FRR.

Figure 1B:
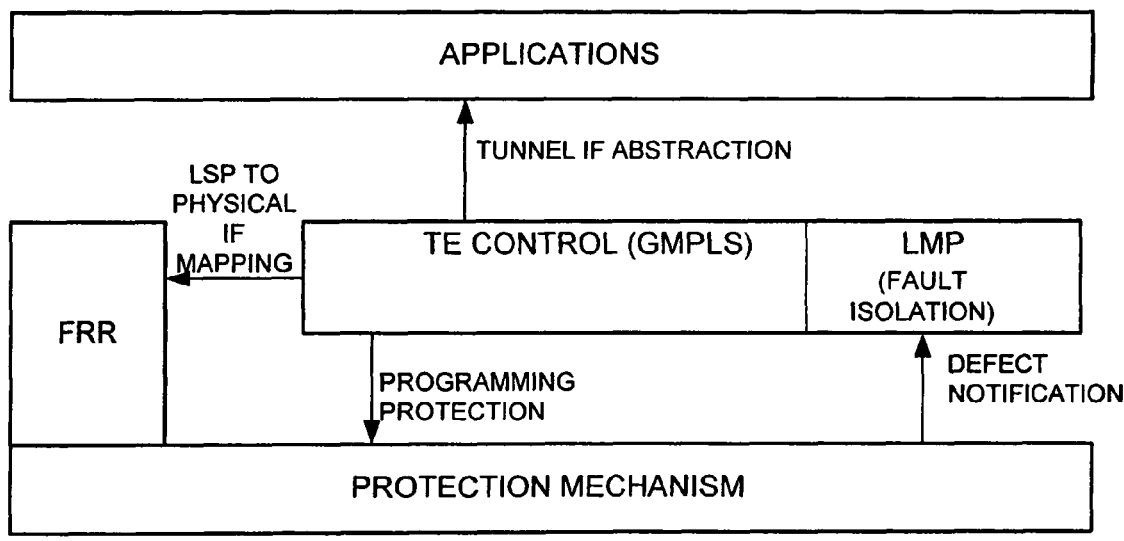
FIG. 1B illustrates interaction between GMPLS control plane and a protection mechanism of the present invention.

FIG. 1B illustrates interaction between the GMPLS control plane and a protection mechanism (e.g., link bundling of the GMPLS tunnel interfaces, SONET APS protection for GMPLS tunnel interfaces, FRR over GMPLS tunnel interfaces, described below). TE control is used to program the protection mechanism. The GMPLS control plane uses APIs provided by the protection layer to associate the physical interfaces traversed by the working and protecting optical LSPs 14, 16 (FIG. 1A). This is referred to as "programming protection" in FIG. 1B. GMPLS has support from the protection layer so that the set of working/protecting interfaces can be changed on-the-fly without traffic loss. TE control abstracts tunnel/LSP interfaces from the protection layer (i.e., protection mechanism), which is not aware how protection is configured by GMPLS. One exception to this abstraction is the FRR (MPLS layer), which has knowledge of the optical LSP interfaces. GMPLS layer provides LSP interface to physical interface mapping such that FRR can take appropriate actions upon defect notification for the physical interfaces in question. Defect notification is not needed by the TE control, which receives alarm notifications or responds to failure based RSVP (Resource ReSerVation protocol) notification (e.g., on Path Error notification).

TE control abstracts the underlying physical interfaces of an optical LSP from the applications. Failure of the working or protecting component LSP is not visible to the applications using the tunnel interfaces as long as there are other means (via protection) for forwarding the traffic over the tunnel interface.

The following describes the present invention from a router-to-router GMPLS circuit perspective, however, it is to be understood that the invention is also applicable to other optical/routing devices which establish forwarding adjacency using GMPLS or any other optical technology.

Dynamic Bundles

A number of LSPs are established during GMPLS tunnel setup. The traffic may be arranged or duplicated any number of ways, as is well known by those skilled in the art. The paths are grouped into one or more bundles. With link bundling of the GMPLS interface, the component membership to the bundle is decided upon by the GMPLS control plane, which brings in the data plane aspect of dynamic membership. The LSPs in a bundle are established between the same source and destination nodes and, based on configuration or enforced SLA, they have a certain degree of diversity and optimality. These LSPs may be re-optimized or re-routed due to topology changes or failures in the network. As different network events change the egress physical interfaces of the LSPs, the membership in the dynamic bundle changes on-the-fly. The data plane protection mechanism (e.g., link bundling of GMPLS tunnel interfaces or SONET APS protection for GMPLS tunnel interfaces) is also selected based on the configuration or SLA. The selected data plane protection mechanism also may change due to configuration or policy changes. These changes are handled with minimum impact by the GMPLS control plane when handled through dynamic bundles.

Another aspect of dynamic bundles is the handling of LSP bundles in the control plane. When an LSP set is created, if the routes are dynamically computed, a certain degree of diversity/optimality may be requested and realized. When a re-optimization operation is triggered (for example in the case where there is a change in topology or when an LSP needs to be re-routed due to a failure), an attempt is preferably made to maintain the degree of diversity/optimality at the set level. To realize this, path computation is used to determine a new LSP set. The LSPs in the new set can share resources with any subset of the old paths. This procedure is referred to as "make-a-set-before-break-a-set" and is described below.

Figure 2:
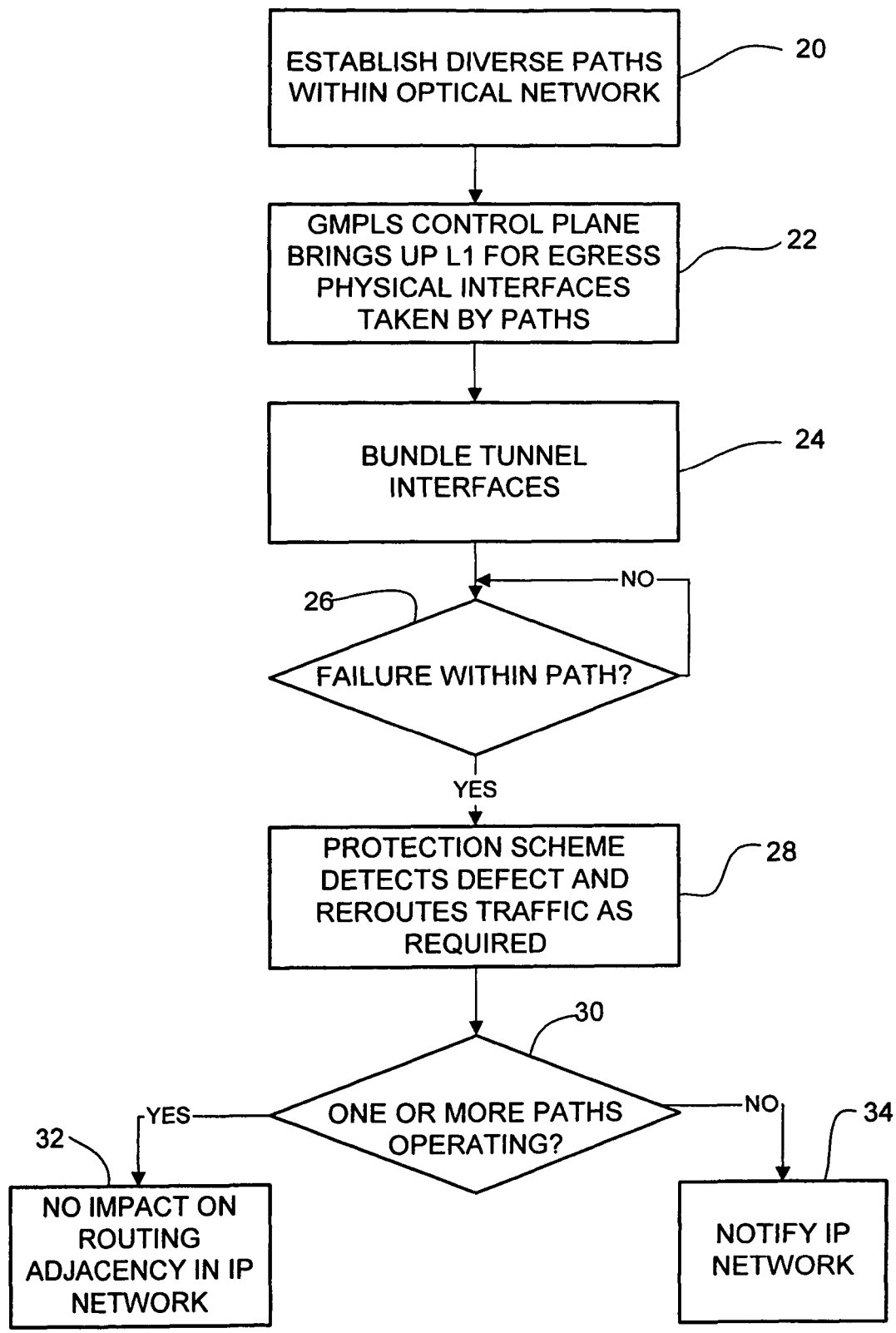
FIG. 2 is a flowchart illustrating a process for maintaining dynamic bundles for protection in an IP +optical network.

FIG. 2 is a flowchart illustrating one example of a process of the present invention for maintaining and using dynamic bundles for network protection. At step 20, "N" link/node/SRLG (Shared Risk Link Group) diverse paths are established inside the optical network. The value "N" is a configurable parameter. After path computation and signaling is completed, TE control has the knowledge of physical interfaces that need to be protected (i.e., egress interfaces on GMPLS paths). At step 22, the GMPLS control plane brings up the L1 (via optical cross connect devices) for the egress physical interfaces taken by the GMPLS path. TE control uses APIs provided by the L2 bundling to bundle the tunnel interfaces using the physical interfaces previously computed (step 24) (see "programming protection" described above). After step 24, there are a bundle of "N" optical connections at the two ends of the routers using a L2 bundling technique that is supported, for example, by routers such as GSR (Gigabit Switch Router) and CRS (Carrier Routing System). The "N" GMPLS paths appear as a single routing adjacency in the IP network. When a failure occurs on any node/link on the path of the GMPLS LSPs, the protection scheme detects the defect (e.g., LOS, RDI, etc.) without involvement of the GMPLS control plane (steps 26 and 28). As long as 1-out-of-N GMPLS paths is up, routing adjacency at the IP network is not effected by the failure in the optical network (steps 30, 32, 34). The protection scheme is also able to make protection decisions without involving GMPLS control plane. In particular, there is no need to wait for LMP fault isolation or RSVP perr message. Similarly, defect notification is not needed by the TE Control. TE Control responds to failures based on RSVP notification (e.g., on Path Error notification).

When a new optical tunnel is created and added to the bundle, the physical interfaces associated with the optical tunnel interface is identified by a protection module and added to the bundle. If a failure occurs on an optical LSP which is also a component in the L2 bundle, the GMPLS control plane restores the LSP using, for example, a new physical interface and the protection module performs the translation to the new interface that will replace the old one. In other words, as GMPLS LSPs can change paths on-the-fly (e.g., due to rerouting in the event of a failure, re-optimization, etc.), TE control can change membership of the bundled interface in the event of a re-route of the GMPLS LSP.

Figure 3:
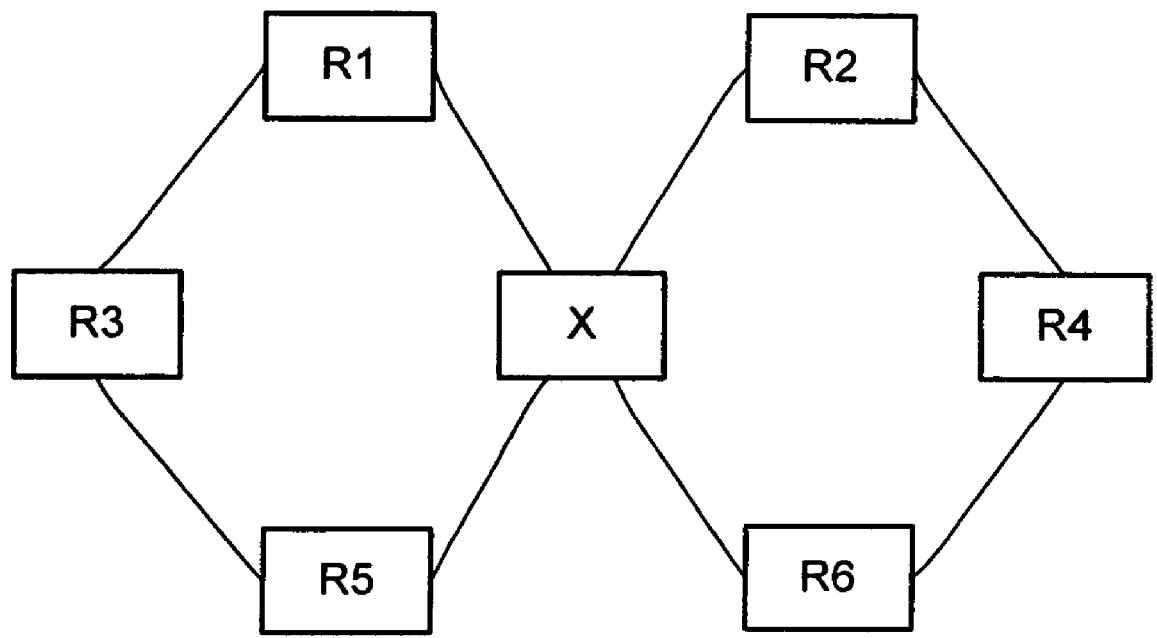
FIG. 3 illustrates a plurality of nodes having two dynamic bundles with two component LSPs.

In order to better illustrate the make-a-set-before-break-a-set process, the following example is provided. In this example, a dynamic bundle with two components LSP1 and LSP2 is created, with the two LSPs being setup with link and node diversity (FIG. 3):

LSP1-R3,R1,R6,R4(cost=30)

LSP2-R3,R5,R2,R4(cost=30)

In this example, all links are assumed to have cost equal to 10, therefore LSP1 and LSP2 each have a cost equal to 30.

Figure 4:
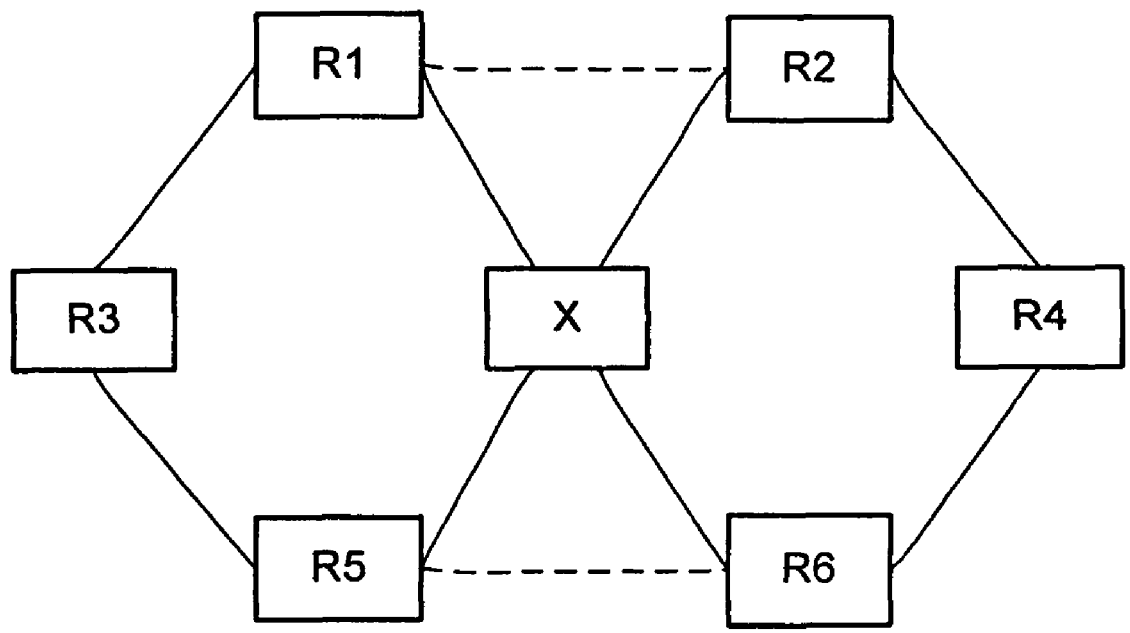
FIG. 4 illustrates the plurality of nodes shown in FIG. 3 with two new links added.

As shown in FIG. 4, two new links (shown with dashed lines) with cost equal to 5 are added to connect R1 with R2 and R5 with R6. If re-optimized as a set the new LSPs will be:

LSP1-R3,R1,R2,R4(cost 25)

LSP2-R3,R5,R6,R4(cost 25)

Without an optimization that treats the two LSPs as a set, where LSPs are individually re-optimized, the new paths would not be found if the diversity requirement is kept.

It is to be understood that changes may be made to the process described above without departing from the scope of the present invention. For example, the process may be extended to a generic set of LSPs (e.g., all LSPs between two nodes or all LSPs with certain affinity requirements).

Dynamic FRR

Dynamic FRR extends link protection schemes, such as FRR (Fast Reroute), to handle GMPLS LSPs. A GMPLS LSP (G-LSP) is protected using a backup tunnel (TE-LSP) in a similar way as to how FRR is realized for physical links.

The association between the outgoing interface of G-LSP (the FRR protected interface) and the backup tunnel interface of TE-LSP is dynamic in nature and is handled by the GMPLS control plane for seamless integration. There is a new diversity aspect that is introduced by the fact that the 'protected link' is an LSP with the dynamic aspect attached to it. G-LSP and TE-LSP are preferably initially setup with a maximum diversity degree. Different network events may change the route of the G-LSP that may end up sharing resources (or SRLGs) with the TE-LSP. However, this is not desirable, and a new procedure is required. The procedure described herein coordinates between a number (two for the FRR case) of make-before-break operations. The procedure is referred to herein as set-of-makes-before-breaks and is described below.

In general, set-of-make-before-break refers to the synchronization of a number of make-before-break procedures for related LSPs. In the case of FRR, the G-LSP re-route or re-optimization procedure is performed in parallel with the path re-computation for the backup TE-LSP, with the diversity requirement defining the relation between the two.

Figure 5:
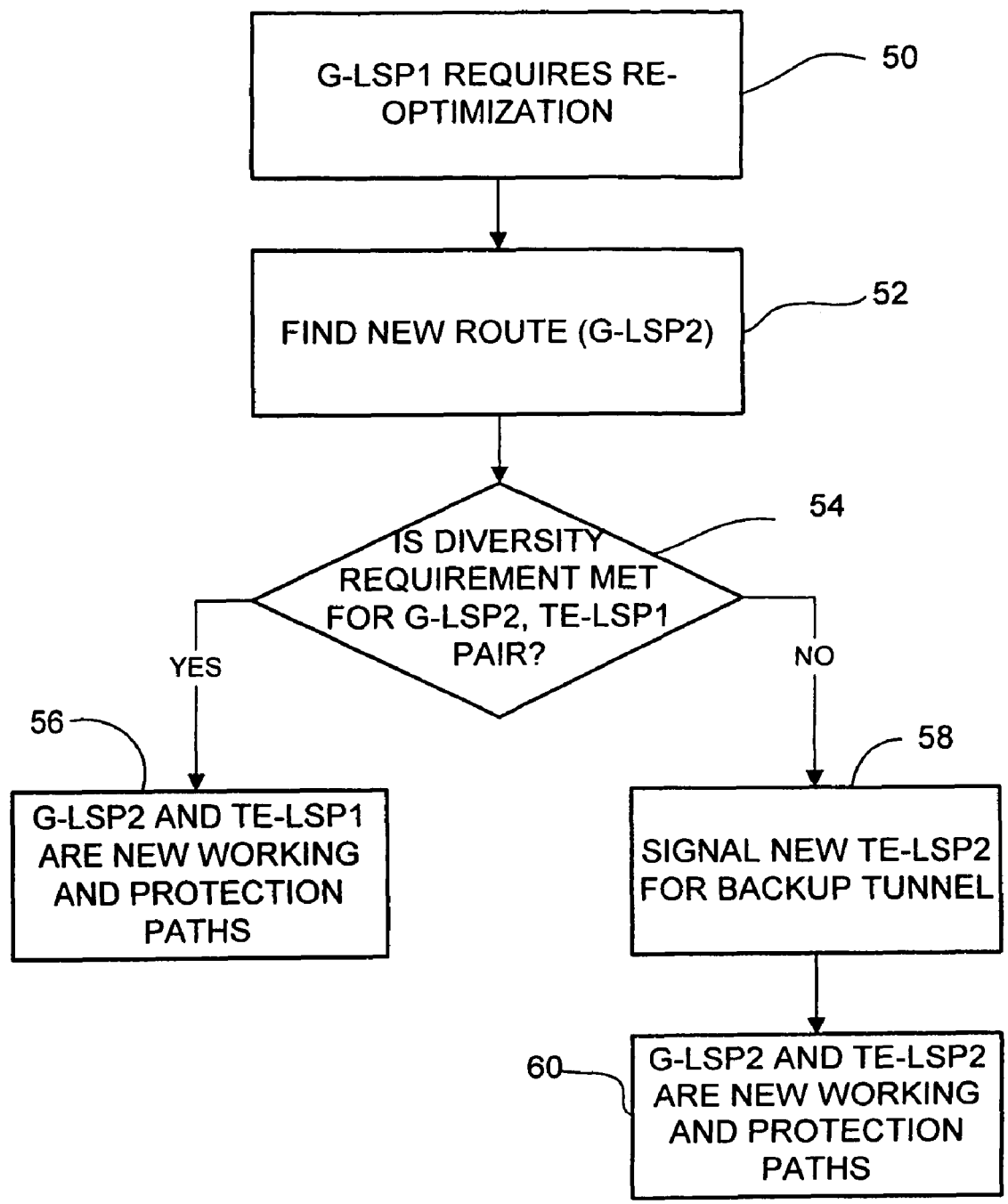
FIG. 5 is a flowchart illustrating a process for dynamic FRR.

FIG. 5 is a flowchart illustrating one example of a process of the present invention for dynamic FRR. At step 50, G-LSP1 needs to be re-optimized. A new (better) route is determined and G-LSP2 is ready to be signaled using a make-before-break procedure (step 52). Since G-LSP1 is protected by TE-LSP1, a determination is made if the (G-LSP2, TE-LSP1) pair still satisfies the diversity requirement (step 54). If this requirement is met, G-LSP2 and TE-LSP1 are the new working and protecting paths, respectively (step 56). If this requirement is not met, a new TE-LSP2 is signaled for the backup tunnel using a make-before-break procedure (steps 58 and 60). In order to minimize the window where a failure will have an impact on the data traffic, these two procedures are synchronized. The diversity requirement may be specified, for example, with respect to link diversity, node diversity, SLRG diversity, or any combination thereof.

Figure 6:
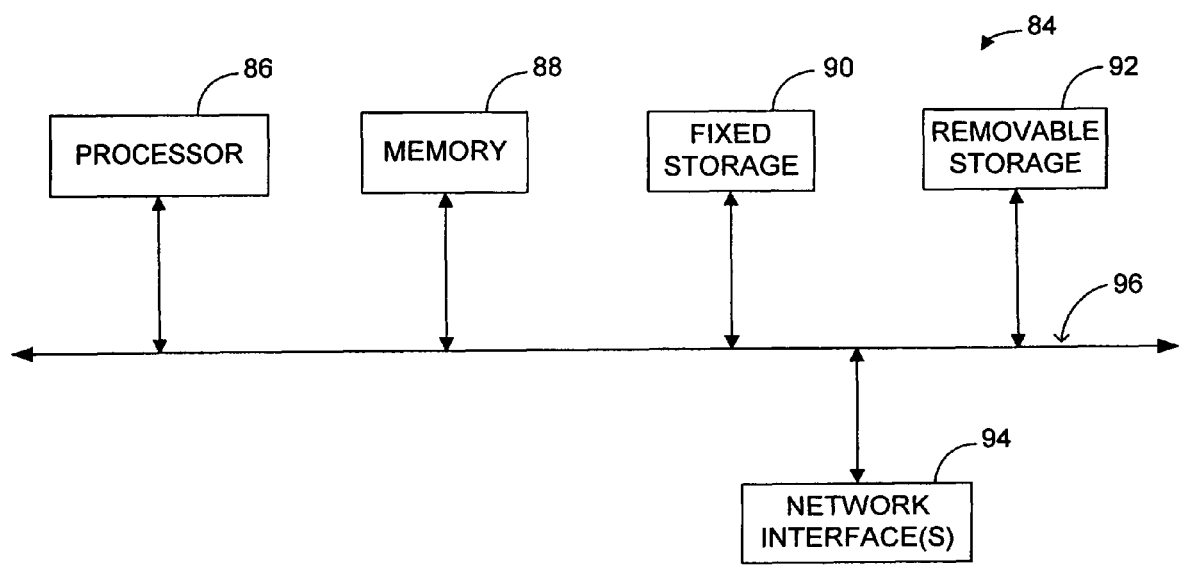
FIG. 6 is a system block diagram of a computer system that can be utilized to execute software of an embodiment of the present invention.

The invention described herein may be implemented in dedicated hardware, microcode, software, or photonic (optical) logic. FIG. 6 shows a system block diagram of computer system 84 that may be used as a router or host or used to execute software of an embodiment of the invention. The computer system 84 includes memory 88 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 84 further includes subsystems such as a central processor 86, fixed storage 90 (e.g., hard drive), removable storage 92 (e.g., CD-ROM drive), and one or more network interfaces 94. Other computer systems suitable for use with the invention may include additional or fewer subsystems. For example, computer system 84 may include more than one processor 86 (i.e., a multi-processor system) or a cache memory.

The system bus architecture of computer system 84 is represented by arrows 96 in FIG. 6. However, these arrows are only illustrative of one possible interconnection scheme serving to link the subsystems. For example, a local bus may be utilized to connect the central processor 86 to the system memory 88. Computer system 84 shown in FIG. 6 is only one example of a computer system suitable for use with the invention. Other computer architectures having different configurations of subsystems may also be utilized. Communication between computers within the network is made possible with the use of communication protocols, which govern how computers exchange information over a network.

As can be observed from the foregoing, the system and method described herein have many advantages. The present invention provides load balancing in IP+optical networks, transparency to network applications, flexible incremental bandwidth, and resiliency and fast convergence. The method and system described herein also make use of existing protection schemes (including SONET APS functions and hardware) by introducing a layer for mapping tunnel interface to physical interface and programming the protection scheme that is supported. The present invention also provides a more optimum way to reoptimize resources by extending the shared resources to a bigger set of LSPs. The method and system also provide a solution for reoptimization for a tunnel protected end-to-end system and makes use of local protection if local protection is supported by the optical network. Furthermore, a solution for use of FRR in the context of GMPLS is provided.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for dynamic protection of virtual links for paths of an optical network in communication with an IP network, the method comprising:
    establishing two or more Generalized MultiProtocol Label Switching (MPLS) paths within the optical network;
    grouping two or more of said GMPLS paths in a dynamic bundle, the grouping selected at a GMPLS control plane; and
    performing an end-to-end recovery on one of said GMPLS paths from its source node to its destination node;
    wherein said bundle of paths are recognized as a single routing adjacency in the IP network such that as long as one or more paths within the bundle is operating the routing adjacency in the IP network is not affected by changes within said bundle and protection decisions are made without the GMPLS control plane.

2. The method of claim 1 wherein the virtual links are implemented as generalized label switched paths.

3. The method of claim 1 further comprising detecting a failure in one of said paths at a data plane level.

4. The method of claim 3 further comprising rerouting traffic to a backup path within said bundle.

5. The method of claim 1 further comprising creating a new path and adding said new path to said bundle.

6. The method of claim 5 wherein adding said new path to said bundle comprises adding a physical interface associated with said new path to said bundle.

7. The method of claim 1 further comprising re-optimizing said paths within said bundle.

8. The method of claim 7 further comprising maintaining optimality or diversity during optimization.

9. The method of claim 1 further comprising protecting said paths using a data plane protection mechanism.

10. The method of claim 9 wherein said data plane protection mechanism is SONET APS protection.

11. The method of claim 1 wherein grouping two or more paths comprises bundling GMPLS tunnel interfaces.

12. A non-transitory computer readable storage medium encoded with computer executable instructions for dynamic protection of virtual links for paths of an optical network in communication with an IP network; the computer executable instructions comprising: code that provides dynamic link protection in an optical network in communication with the IP network, comprising: code that establishes two or more paths within the optical network; code that groups two or more of said paths in a dynamic bundle, the groups selected at a control plane level; and code that performs an end-to-end recovery on one of said GMPLS paths from its source node to its destination node; wherein said bundle of paths are recognized as a single routing adjacency in the IP network such that as long as one or more paths within the bundle is operating the routing adjacency in the IP network is not affected by changes within said bundle and protection decisions are made without the control plane.

13. The computer readable storage medium of claim 12 further comprising code that detects a failure in one of said paths at a data plane level.

14. A system for dynamic protection of virtual links for paths of an optical network in communication with an IP network, the system comprising: means for establishing two or more paths within the optical network; means for grouping two or more of said paths in a dynamic bundle, the grouping selected at a control plane level; and means for performing an end-to-end recovery on one of said GMPLS paths from its source node to its destination node; wherein said bundle of paths are recognized as a single routing adjacency in the IP network such that as long as one or more paths within the bundle is operating the routing adjacency in the IP network is not affected by changes within said bundle and protection decisions are made without the control plane.

15. The system of claim 14 further comprising means for maintaining optimality or diversity during optimization.

16. A system for dynamic end-to-end path protection in an optical network in communication with an IP network, the system comprising: a processor operable to create two or more paths within the optical network and group two or more of said paths in a bundle, said bundle comprising at least one working path and at least one protecting path each extending from an ingress router to an egress router; and a protection module configured to dynamically identify a physical interface associated with an optical tunnel interface for a new path and replace one of said paths in said bundle with said new path, wherein the protection module is configured to manage component interfaces of the bundle, maintain synchronization with a data plane protection mechanism, and perform an end-to-end recovery on one of said GMPLS paths from its source node to its destination node; wherein said bundle of paths are recognized as a single routing adjacency in the IP network such that as long as one or more paths within the bundle is operating the routing adjacency in the IP network is not affected by changes within said bundle and protection decisions are made without the GMPLS control plane.

17. The system of claim 16 wherein the paths are generalized label switched paths.

18. The system of claim 17 wherein the processor is configured to restore a failed generalized label switched path using the GMPLS control plane.

* * * * *